(12) United States Patent
Adams, Jr.

(10) Patent No.: US 6,349,891 B1
(45) Date of Patent: Feb. 26, 2002

(54) TAPE DRIVE EJECTION ASSEMBLY

(75) Inventor: Richard J. Adams, Jr., Boulder, CO (US)

(73) Assignee: Benchmark Storage Innovations, Inc., Boulder, CO (US)

( * ) Notice: Subject to any disclaimer, the term of this patent is extended or adjusted under 35 U.S.C. 154(b) by 0 days.

(21) Appl. No.: 09/615,550

(22) Filed: Jul. 13, 2000

(51) Int. Cl.[7] .............................................. G11B 23/04
(52) U.S. Cl. ...................... 242/339; 242/338.1; 360/93; 360/137
(58) Field of Search ............................. 242/338, 338.1, 242/338.3, 339; 360/93, 137

(56) References Cited

U.S. PATENT DOCUMENTS 4,720,913 A * 1/1988 Hertrich .................. 242/332.4

* cited by examiner

*Primary Examiner*—John Q. Nguyen
(74) *Attorney, Agent, or Firm*—Patton Boggs LLP

(57) ABSTRACT

A tape drive ejection assembly that controls ejection of a tape cartridge to prevent over ejection errors in a tape drive. The ejection assembly comprises an ejection carriage, a carriage pin, a rotary damper and a spring mounted on a frame. The ejection carriage slides within the frame during insertion and ejection of the tape cartridge. The spring connects between the frame and the ejection carriage and provides the force to eject the tape cartridge. The rotary damper controls movement of the ejection carriage within the frame during ejection of the tape cartridge. The carriage pin includes a rib configured to form a snap connection with the tape cartridge during loading of the tape cartridge. The snap connection between the rib and the tape cartridge secures the tape cartridge to the ejection carriage during and after ejection of the tape cartridge. The connection is not released until a significant external force is applied on the tape cartridge.

11 Claims, 5 Drawing Sheets

TAPE DRIVE EJECTION ASSEMBLY

FIELD OF THE INVENTION

The invention relates to tape drive storage devices, and in particular, to an ejection assembly for tape drives that prevents over ejection of a tape cartridge from the tape drive.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design, which utilizes a supply reel located within a removable tape cartridge and a takeup reel located within the tape drive.

One popular application for single reel tape drives is in automated tape library systems. An automated tape library system contains a plurality of tape drives and a plurality of tape cartridge storage locations. An automatic retrieval/transport mechanism services the plurality of tape drives to transport tape cartridges between the plurality of tape drives and the storage locations. For example, the automatic retrieval/transport mechanism is pre-programmed to retrieve tape cartridges from their assigned tape cartridge storage locations in the automated cartridge library system and load the retrieved tape cartridges into the tape drives for data storage. When a tape drive is finished with a tape cartridge, the tape cartridge is ejected from the tape drive. The automatic retrieval/transport mechanism retrieves the tape cartridge from the tape drive and returns it to its assigned tape cartridge storage location.

To enable retrieval of the tape cartridge from the tape drive by the automatic retrieval/transport mechanism, the ejection of the tape cartridge must be accurately regulated to consistently eject the tape cartridge to a precise retrieval position. Referring to FIGS. 1 and 2, a spring loaded cartridge ejection assembly 100 accurately regulates ejection of the tape cartridge 102. During insertion of the tape cartridge 102 into the tape drive 106, the tape cartridge 102 engages an ejection carriage 103. The ejection carriage 103 slides in frame 105 along insertion direction A until it locks into a loaded position. As the tape cartridge 102 engages the ejection carriage 103, a carriage pin 101 inserts into an aperture 108 in the tape cartridge 102, engages a supply reel lock 200, and rotates the supply reel lock 200 to unlock the supply reel 107 as illustrated by FIG. 2. During ejection of the tape cartridge 102, the ejection carriage 103 is released from the loaded position and driven by spring 104 in direction B to slide the tape cartridge 102 out of the tape drive 106 to an ejected position. A rotary damper 109 controls the ejection speed and limits the momentum of the tape cartridge 102 during movement of the tape cartridge 102 from the loaded position to the ejected position.

After the tape cartridge 102 is in the ejected position, the carriage pin 101 and supply reel lock 200 are designed to remain engaged as illustrated by FIG. 2, until the tape cartridge 102 is pulled from the tape drive 106 by hand or by the automatic retrieval/transport mechanism. Unfortunately, the force required to disengage the 15 carriage pin 101 and supply reel lock 200 is only about 40 to 50 grams, thus several conditions exist that cause premature disengagement or an over ejection error as it is known in the art. During an over ejection error, the tape cartridge 102 moves beyond the unloaded position of the ejection carriage 103. The over ejected tape cartridge 102 often cannot be removed by the automatic retrieval/transport mechanism, requiring human intervention to reposition the tape cartridge 102 for retrieval by the automatic retrieval/transport mechanism. One condition that causes an over ejection error in tape drives is the inherent vibration of the tape cartridge library system. These vibrations cause the tape cartridge 102 to vibrate beyond the unloaded position of ejection carriage 103 out of the tape drive 106. Another condition that causes an over ejection error is variations in the tolerances of the ejection spring 104 over the life of the tape drive 106. Yet another condition that causes an over ejection error is variations in the performance of the rotary damper. Finally, another condition that causes an over ejection error is variations in friction between the tape cartridge 102 and the tape drive 106 that cause the ejection carriage 103 to over eject the tape cartridge 102.

SOLUTION

The present invention overcomes the problems outlined above and advances the art by providing an ejection assembly that prevents over ejection errors in tape drives. The ejection assembly comprises an ejection carriage mounted in a tape drive that includes a carriage pin integrally formed in one end of the ejection carriage, a frame, a rotary damper and a spring. The ejection carriage slides within the frame during insertion and ejection of the tape cartridge in the tape drive. The spring connects between the frame and ejection carriage and provides the force to eject the tape cartridge from the tape drive. The rotary damper controls the momentum of the ejection carriage within the frame during ejection of the tape cartridge. The present ejection assembly improves over the prior art by including a rib that is integrally formed on the carriage pin. The rib is configured to form a snap connection with the supply reel lock of a tape cartridge as the tape cartridge is inserted into the tape drive. The snap connection between the rib and the supply reel lock secures the tape cartridge to the ejection carriage during insertion and ejection of the tape cartridge in the tape drive. The snap connection is not released until a significant external force is applied on the tape cartridge after the tape cartridge is ejected from the tape drive. In the context of the present invention ejecting the tape cartridge from the tape drive is defined as the process of moving the tape cartridge out of the tape drive to an ejected position. The ejected position is representative of a position where a user or an automatic retrieval/transport mechanism may remove the tape cartridge from the tape drive.

A first advantage of the present ejection assembly is that the rib on the carriage pin can be configured to different dimensions to control the amount of external force required to remove the tape cartridge from the tape drive. A second advantage of the present ejection assembly is that it provides a low cost solution to the over ejection error problem. A third advantage of the present ejection assembly is that it does not require an altered tape cartridge format. Similarly, a fourth advantage of the present ejection assembly is that it does not require modification of conventional retrieval/transport mechanisms in automated tape library systems. It can be appreciated that not modifying the tape cartridge format or the retrieval/transport mechanism represents a significant advantage to consumers whose data is currently stored on conventional tape cartridges in conventional tape cartridge library systems.

DETAILED DESCRIPTION

Figure 1:
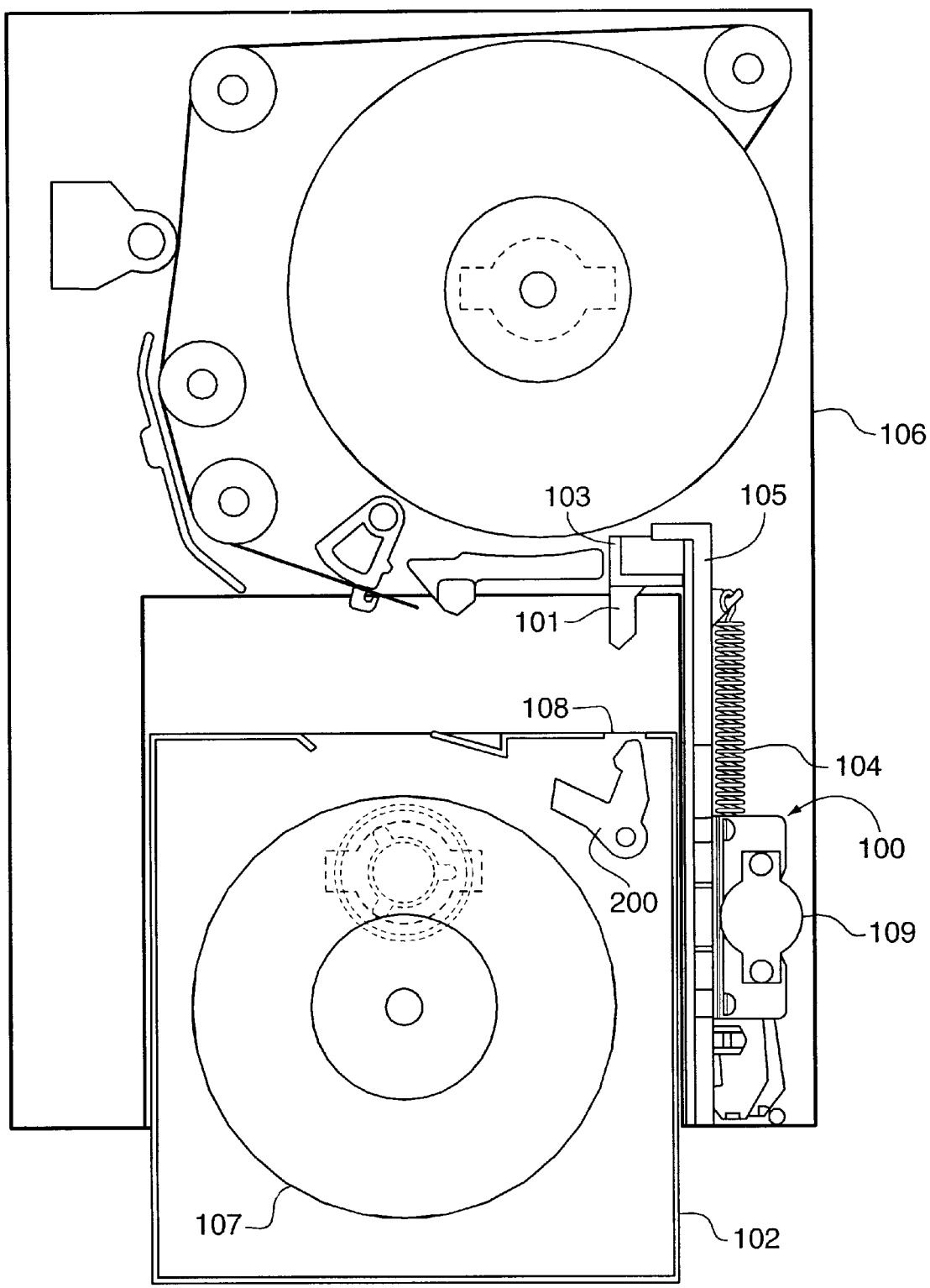
FIG. 1 illustrates a cross-section view of an example of a prior art ejection assembly in a prior art tape drive and a tape cartridge.
Figure 2:
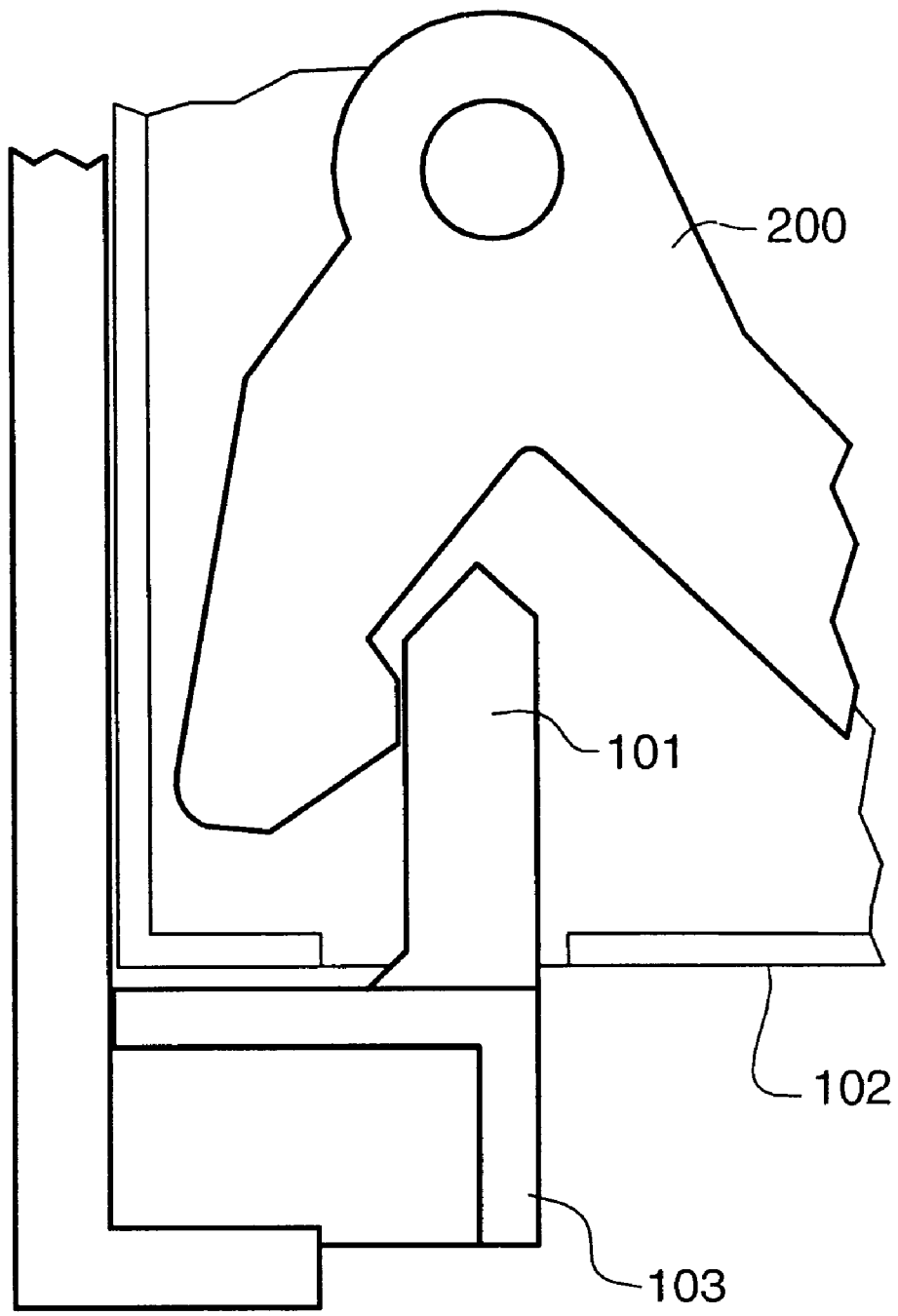
FIG. 2 illustrates a partial exploded view of an engagement of a supply reel lock in a tape cartridge by a prior art ejection assembly.
Figure 3:
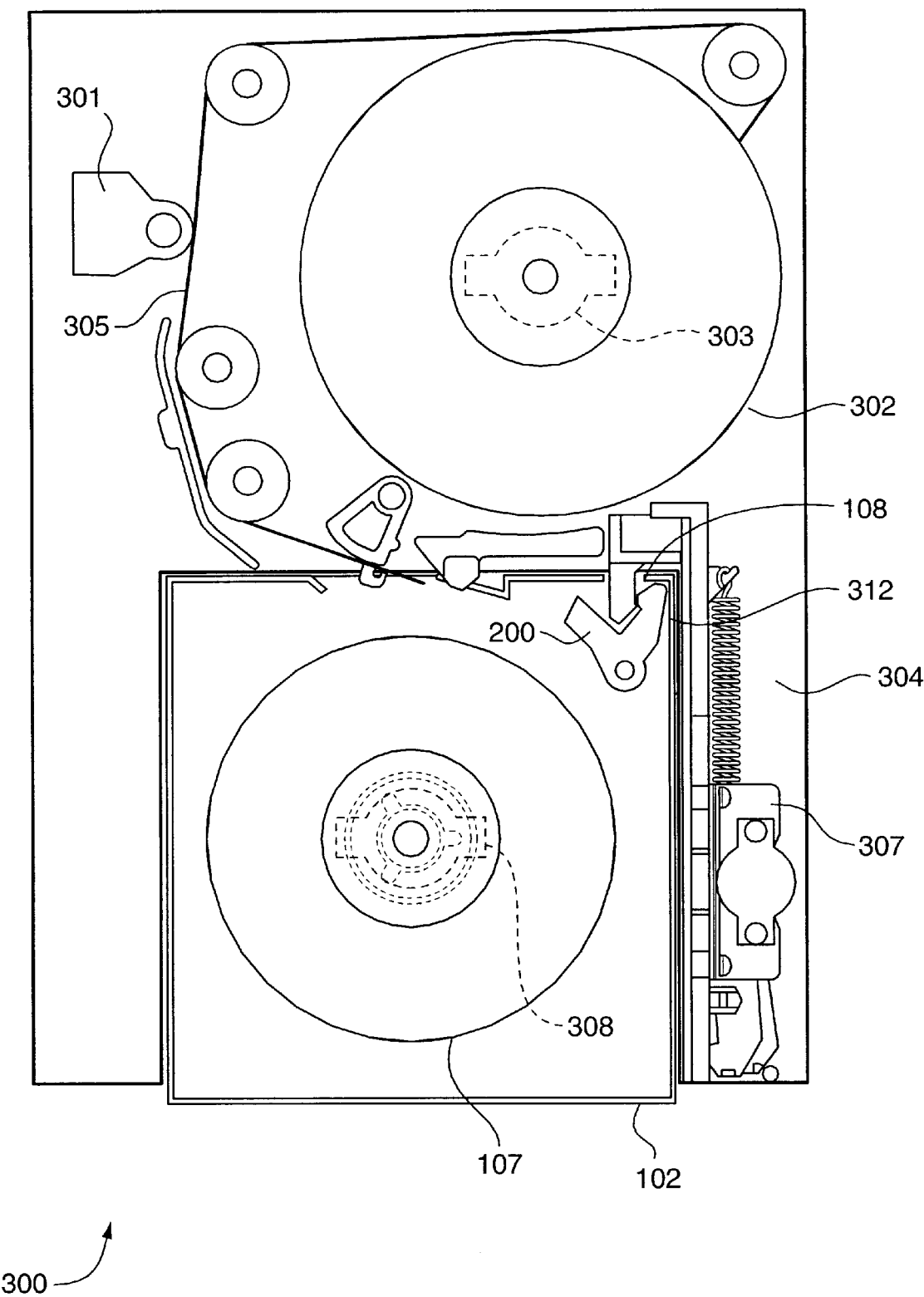
FIG. 3 illustrates a cross-section view of a tape drive configured with an example of an ejection assembly according to the present invention.

FIG. 3 illustrates a tape drive 300 configured with an ejection assembly 307 according to the present invention. The tape drive 300 includes a tape head 301, an internal takeup reel 302 driven by a takeup reel drive motor 303, and a tape cartridge receiver 304. Magnetic tape media 305 is provided to the tape drive 300 by the tape cartridge 102 inserted into the tape cartridge receiver 304. The tape cartridge 102 includes the supply reel lock 200 and the supply reel 107 driven by a supply reel drive motor 308, when the tape cartridge 102 is loaded into the tape cartridge receiver 304. The ejection assembly 307 engages the supply reel lock 200, to unlock the supply reel 107 when the tape cartridge 102 is inserted into the tape drive 300.

Figure 4A:
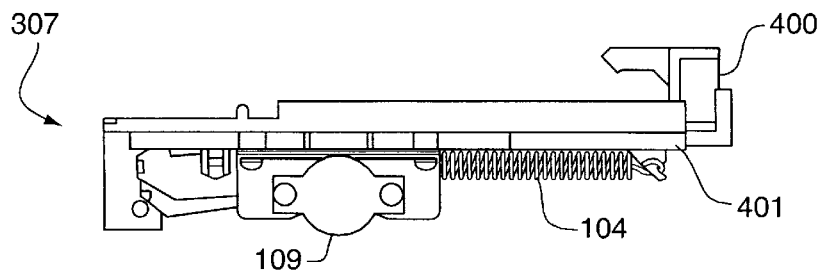
FIG. 4 illustrates perspective top and side views of an ejection assembly according to the present invention.
Figure 4B:
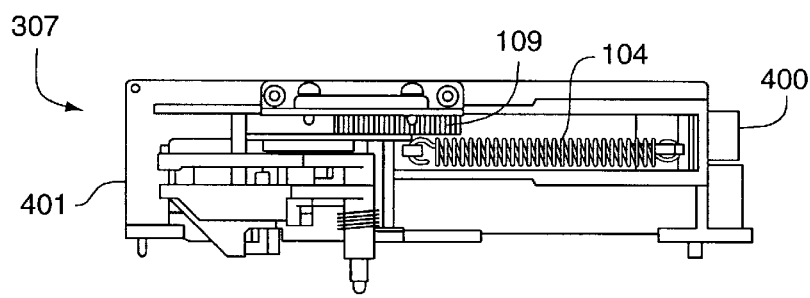
Figure 5A:
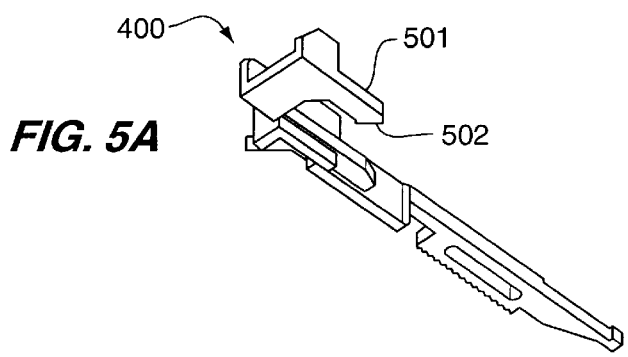
FIG. 5 illustrates a perspective top and bottom view of an ejection carriage and carriage pin according to the present invention.
Figure 5B:
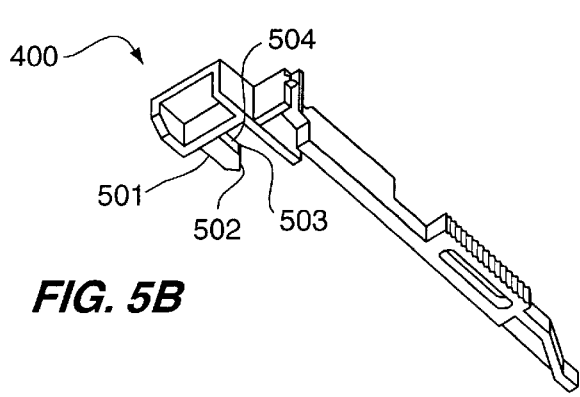
Figure 5C:
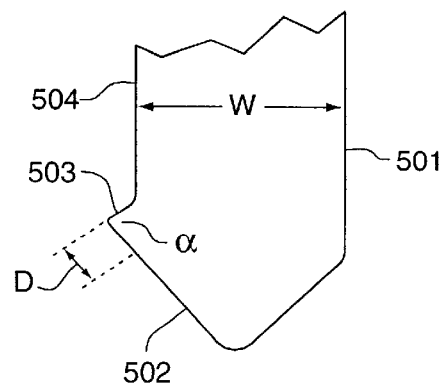
Figure 6:
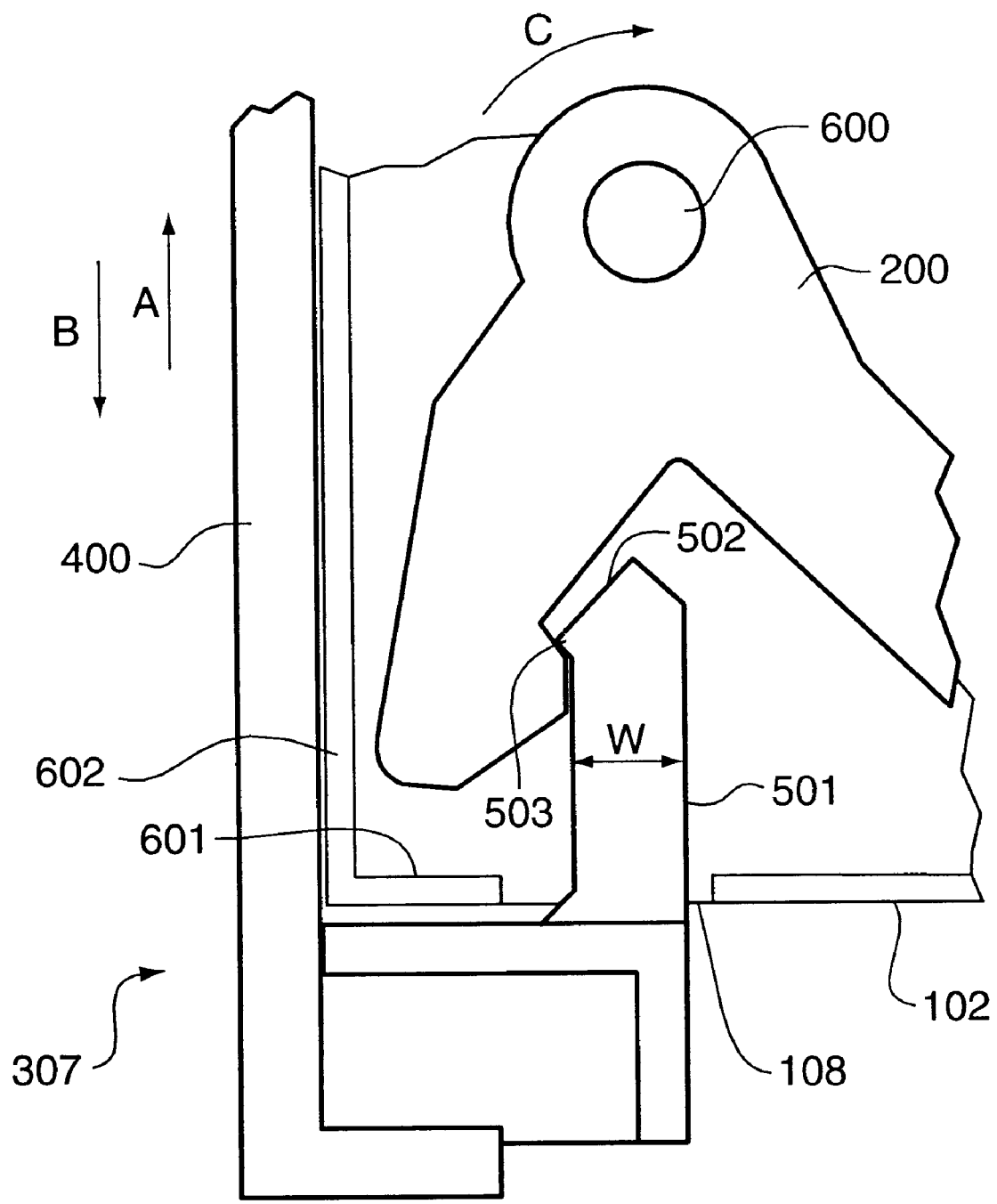
FIG. 6 illustrates a partial exploded view of the snap connection between an ejection assembly according to the present invention and a tape cartridge.

FIGS. 4–6 are perspective views illustrating an example of the ejection assembly 307 according to the present invention. Referring first to FIG. 4, the ejection assembly 307 comprises a frame 401 on which is mounted a rotary damper 109, an ejection carriage 400 and a spring 104. The rotary damper 109, the ejection carriage 400 and the spring 104 are mounted on the frame 401 in a conventional manner. The ejection carriage 400 slides within the frame 401 during insertion and ejection of the tape cartridge 102. The spring 104 connects between the frame 401 and ejection carriage 400 and provides the force to eject the tape cartridge 102. The rotary damper 109 controls the movement of the ejection carriage 400 within the frame 401 during ejection of the tape cartridge 102. Referring to FIG. 5, the ejection carriage 400 includes a carriage pin 501 integrally formed in one end. The carriage pin 501 comprises a ramped supply reel lock interface 502 that extends beyond an interior face 504 of the carriage pin 501 to form a triangular rib 503 at the intersection of the interior face 504 and the supply reel lock interface 502.

Advantageously, the rib 503 is configured to form a snap connection with the supply reel lock 200 to prevent over ejection of the tape cartridge 102. In operation, the tape cartridge 102 is loaded into the tape cartridge receiver 304. As the tape cartridge 102 is inserted, the carriage pin 501 on the ejection carriage 400 passes through the aperture 108 in the tape cartridge 102 to engage the supply reel lock 200 via the supply reel lock interface 502. Referring to FIG. 6, as the tape cartridge 102 is inserted, the supply reel lock interface 502 rotates the supply reel lock 200 in direction C about point 600 until the supply reel lock 200 snaps into position as the supply reel lock 200 clears the rib 503. The snap connection is created by the rib 503 and the supply reel lock 200, which is spring loaded and designed to return to its relaxed position; the position prior to engaging the carriage pin 501. As the supply reel lock 200 is rotated about point 600, the supply reel 107 is unlocked so that the tape media 305 can be delivered to the takeup reel 302. As insertion of the tape cartridge 102 continues further, the face 601 of the tape cartridge 102 moves the ejection carriage 400 in the frame 401 along the insertion direction A until the ejection carriage 500 locks into the loaded position. It should be noted that in the loaded position the tape media 305 is positioned for connection to the takeup reel 302, such as described in U.S. Pat. No. 4,720,913 entitled "Mechanism for Joining Tape Leaders."

During ejection of the tape cartridge 102, the ejection carriage 400 is released from its locked position and driven by the spring 104 in direction B to slide the tape cartridge 102 out of the tape drive 300. The rotary damper 109 controls the ejection speed in a conventional manner as the ejection carriage 400 moves along direction B to the unloaded position. Advantageously, the snap connection between the carriage pin 501 and the supply reel lock 200, does not disconnect during the ejection, or after the ejection of the tape cartridge 102 without application of a significant external force. In some examples of the present ejection assembly 307, as much as half a pound of external force is required to disconnect the snap connection between the carriage pin 501 and the supply reel lock 200.

Referring again to FIG. 5, in one example of the present ejection assembly 307, the rib 503 is formed by extending the planer surface of the supply reel lock interface 502 a distance D beyond the interior face 504 of the carriage pin 501. This has the important advantage of not interfering with the planer surface of the supply reel lock interface 502 so that a smooth insertion of the tape cartridge 102 is maintained when the supply reel lock interface 502 engages the supply reel lock 200. Also advantageously, with the exception of the rib 503 on the carriage pin 501, the width W of the carriage pin 501 remains unchanged. Even more importantly, the combined width of the supply reel lock 200 and the carriage pin 501 remains the same after the supply reel lock 200 snaps beyond the rib 503, thus preserving the limited clearance between the supply reel lock 200 and the tape cartridge wall 602, as illustrated by FIG. 6.

A further advantage of the present ejection assembly is that the distance D and the angle α control the amount of external force required to remove the tape cartridge 102 from the tape drive 300. For example, reducing the distance D and increasing the angle α will reduce the amount of external force required to disconnect the carriage pin 501 and the supply reel lock 200. Similarly, increasing the distance D and decreasing the angle a will increase the external force required to disconnect the carriage pin 501 and the supply reel lock 200. Those skilled in the art will appreciate that numerous combinations of the distance D and angle α exist, and may be used in accordance with the present invention, to achieve a desired retention of the connection between the carriage pin 501 and the supply reel lock 200, subject to the limitation of clearance between the supply reel lock 200 and the tape cartridge wall 602. Alternatively, the rib 503 could also be configured in different geometric shapes to accommodate different tape cartridge designs or to achieve the desired retention of the connection between the carriage pin 501 and the supply reel lock 200. For example the rib 503 could be arcuate in design or even rectangular in design. Advantageously, this permits the retention to be precisely controlled to accommodate different tape cartridge formats and limitations of different automatic retrieval/transport mechanisms in different tape cartridge library systems. In one example of the present invention for conventional DLT tape cartridges, the distance D is in the range of 0.001 inches and 0.060 inches and more preferably is 0.025 inches and the angle α is in the range of 25 degrees and 120 degrees and more preferably is 82.8 degrees.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. An ejection assembly in a tape drive for controlling ejection of a tape cartridge to prevent over ejection of the tape cartridge from the tape drive, the ejection assembly comprises:

means for engaging the tape cartridge as the tape cartridge is inserted into the tape drive, wherein the engaging means engages the tape cartridge and moves with the tape cartridge as the tape cartridge is inserted into a loaded position;

means within the engaging means for forming a snap connection with the tape cartridge during engagement of the tape cartridge; and means for ejecting the tape cartridge from the tape drive, wherein the means for forming the snap connection remains connected to the tape cartridge until an external force is applied on the tape cartridge after the tape cartridge is ejected.

2. The ejection assembly of claim 1, wherein the means for engaging the tape cartridge comprises:

an ejection carriage slidably connected to a frame; and a carriage pin integrally formed in one end of the ejection carriage, wherein the ejection carriage and carriage pin are configured to engage the tape cartridge and move with the tape cartridge as the tape cartridge is inserted into the loaded position.

3. The ejection assembly of claim 2, wherein the means for forming the snap connection comprises:

a rib integrally formed in the carriage pin, wherein the rib snaps together with a corresponding feature in the tape cartridge and remains connected to the corresponding feature until the external force is applied on the tape cartridge after the tape cartridge is ejected from the tape drive.

4. The ejection assembly of claim 3 wherein the rib is triangular in shape.

5. The ejection assembly of claim 4 wherein at least one side and at least one angle of the triangular rib can be dimensioned to control the amount of the external force required to disconnect the carriage pin from the corresponding feature in the tape cartridge.

6. The ejection assembly of claim 2, wherein the means for ejecting the tape cartridge comprises:

a spring connected between the frame and the ejection carriage; and a rotary damper mounted on the frame and configured to control movement of the ejection carriage during ejection of the tape cartridge.

7. A method in a tape drive for controlling ejection of a tape cartridge to prevent over ejection of the tape cartridge from the tape drive, the method comprising:

inserting the tape cartridge into the tape drive;

engaging the tape cartridge with a movable ejection carriage as the tape cartridge is inserted into the tape drive;

forming a snap connection between the tape cartridge and the movable ejection carriage during engagement of the tape cartridge by the movable ejection carriage;

ejecting the tape cartridge from the tape drive without releasing the snap connection; and releasing the snap connection upon application of an external force on the tape cartridge after the tape cartridge is ejected from the tape drive.

8. The method of claim 7, wherein the step of engaging the tape cartridge comprises:

engaging a supply reel lock in the tape cartridge with a carriage pin on one end of the movable ejection carriage;

unlocking the supply reel in the tape cartridge; and sliding the ejection carriage along a frame to a loaded position with the tape cartridge as the tape cartridge is inserted to the loaded position.

9. The method of claim 8, wherein the step of forming the snap connection further comprises:

forming the snap connection between the carriage pin and the supply reel lock as the supply reel lock is engaged by the carriage pin.

10. The method of claim 8, the method further comprising:

controlling an amount of the external force required to release the snap connection after the tape cartridge is ejected from the tape drive.

11. The ejection assembly of claim 7, wherein the step of ejecting the tape cartridge comprises:

moving the tape cartridge out of the tape drive to an unloaded position with the ejection carriage; and controlling the movement of the ejection carriage as the tape cartridge is moved to the unloaded position.

* * * * *